Figure 1:
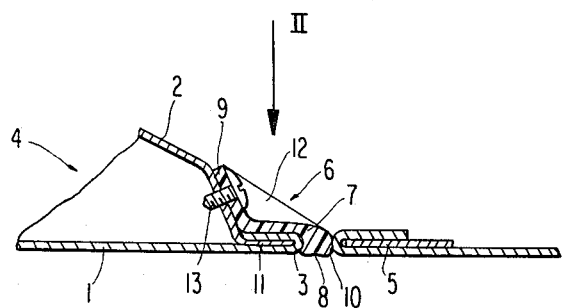

United States Patent [19]

Schmidt et al.

[11] 4,363,838
[45] Dec. 14, 1982

[54] PROTECTIVE EDGE MOLDING FOR VEHICLE PARTS

[75] Inventors: Adolf Schmidt, Sindelfingen; Arno Jambor, Vaihingen; Guntram Huber, Aidlingen-Dachtel, all of Fed. Rep. of Germany

[73] Assignee: Daimler-Benz Aktiengesellschaft, Stuttgart, Fed. Rep. of Germany

[21] Appl. No.: 166,406

[22] Filed: Jul. 7, 1980

[30] Foreign Application Priority Data

Jun. 7, 1979 [DE] Fed. Rep. of Germany ....... 2927272

[51] Int. Cl.³ .............................................. B32B 7/02
[52] U.S. Cl. ..................................... 428/31; 52/716; 52/717; 52/397; 52/403
[58] Field of Search .................... 428/31; 52/716, 717, 52/397, 403

[56] References Cited

U.S. PATENT DOCUMENTS

| | | | |
|---|---|---|---|
| 3,003,185 | 10/1961 | Grunwald | 52/717 |
| 3,494,075 | 2/1970 | Kunevicius | 428/31 |
| 3,547,515 | 12/1970 | Shanok et al. | 428/31 |
| 4,092,813 | 6/1978 | Eggert | 52/397 |
| 4,163,076 | 7/1979 | Katoh | 428/31 |

FOREIGN PATENT DOCUMENTS 1970377  6/1967  Fed. Rep. of Germany ........ 428/31

Primary Examiner—Won H. Louie, Jr.
Attorney, Agent, or Firm—Paul M. Craig, Jr.

[57] ABSTRACT

A protective molding for an edge of a hinged motor vehicle part, characterized in that the molding has a substantially V-shape cross sectional configuration and includes a guide leg terminating along one longitudinal side in an end portion, and a mounting leg for mounting on the vehicle part, the mounting leg being provided along the other longitudinal side of the guide leg, the guide leg defining a contact area adopted to contact an inner surface of the vehicle part adjacent said edge, and in that the end portion of the guide leg curves outwardly with respect to said V-shape configuration of the molding in a hook-shape adapted to surround the edge of the vehicle part for protecting said edge and wherein a portion of the outwardly curved, hook-shaped end portion of the guide leg adapted to surround said edge is tapered.

11 Claims, 2 Drawing Figures

U.S. Patent
Dec. 14, 1982
4,363,838

PROTECTIVE EDGE MOLDING FOR VEHICLE PARTS

The present invention relates to a protection arrangement and, more particularly, to a protective molding of an elastic material adapted to be disposed at the edge of a hinged pivotable or swivelable vehicle part, with the molding including a guide leg passing over along one longitudinal side into an end portion curved outwardly in a hook shape over a contact surface thereof.

In the automobile industry, there have been a number of proposals of providing flanged edges of hinged vehicle parts such as, for example, doors, an engine hood, or a trunk lid, with protective edge moldings to safeguard such flanged areas from, for example, chipping of the paint or the like. Generally, such proposed moldings are constructed in the form of essentially U-shaped profile and are placed on or attached to the edge to be protected with the channel formed by the profile.

For example, in German Utility Model No. 1,970,377, an arrangement is proposed wherein a profile strip, employed as an edge protection, is clamped onto flanges of the vehicle bodies such as, for example, flanges of the vehicle door. A disadvantage of such a proposed edge molding resides in the fact that, due to the projection of one leg of the U-shaped profile beyond an outer surface of the hinged vehicle part, such projection is exposed to an air flow during driving of the vehicle and consequently affects the aerodynamic resistance of the vehicle in addition to producing troublesome wind noises.

The aim underlying the present invention essentially resides in providing a protective molding for the edge of a hinged vehicle part which does not adversely affect the aerodynamic resistance of the vehicle nor produce any troublesome wind noises.

In accordance with the present invention, a substantially V-shaped cross sectional configuration protective edge molding is provided which includes an angularly rigid mounting leg arranged on an opposite longitudinal side of the guide leg, with the mounting leg extending, based on the contact surface, in opposition to a hook-shaped end portion, which terminates in a tapering arcuate portion adjoining an apex of the hook of the hook-shaped end portion.

In accordance with the present invention, the protective edge molding is hung with its hook-shaped end portion into an edge of the hinged vehicle part to be protected and is adapted to be attached under a pretensioning with the mounting leg to the inside of the hinged vehicle part by fastening means such as, for example, a layer of cement or fastening element such as screws. With such an arrangement the protective edge molding is just about flush with an outer surface of the hinged vehicle part with the hook-shaped end portion terminating in the tapering arcuate portion adjoining the apex of the hook thereby preventing an increase in drag along the outer surface of the vehicle part.

In accordance with advantageous features of the present invention, the hook-shaped end portion may have a boundary area disposed approximately in parallel with a contact area of the guide leg. The boundary area may lie at least almost flush with the outer surface of the vehicle part. By providing that the boundary area of the hook-shaped end portion of the protective edge molding be so configured, a joint between the hinged vehicle part and a frame section surrounding the vehicle part is filled out so that the drag coefficient is positively affected by a prevention of eddy formations and interfering wind noises especially at higher operating speeds of the motor vehicle.

In order to rigidify the protective edge molding, in accordance with further advantageous features of the present invention, a plurality of supporting ribs may be spaced along the length of the edge molding at regular intervals, with alignment lines which may converge on an apex of the boundary area of the hook-shaped end portion. Moreover, fastening elements may be arranged on the mounting leg between the supporting ribs so that the protective edge molding may be fastened to an inside of the hinged vehicle part under a pretensioning.

Accordingly, it is an object of the present invention to provide a protective edge molding of elastic material for hinged vehicle parts which avoids, by simple means, shortcomings and disadvantages encountered in the prior art.

Another object of the present invention resides in providing a protective edge molding of elastic material for hinged vehicle parts which may be manufactured easily from a technical viewpoint.

Yet another object of the present invention resides in providing a protective edge molding of elastic material for hinged vehicle parts which does not adversely affect the aerodynamic resistance of the vehicle nor produce troublesome wind noises during operation of the vehicle even at higher speeds.

Figure 2:
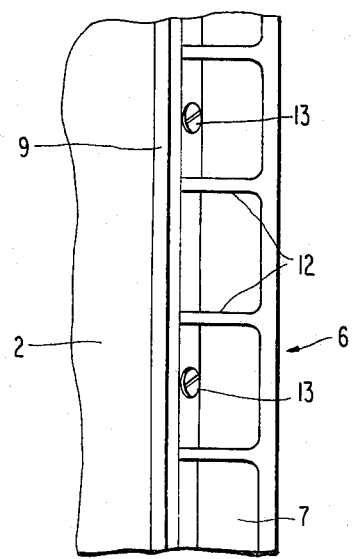

These and other objects, features, and advantages of the present invention will become more apparent from the following description when taken in connection with the accompanying drawings which show, for the purposes of illustration only, one embodiment in accordance with the present invention, and wherein:

FIG. 1 is a fragmentary cross sectional view of a door of a motor vehicle having attached thereto a protective edge molding in accordance with the present invention; and FIG. 2 is a partial plan view of the vehicle door of FIG. 1 taken in the direction of the arrow II.

Referring now to the drawings wherein like reference numerals are used in both views to designate like parts and, more particularly, to FIG. 1, according to this Figure, a vehicle door generally designated by the reference numeral 4 includes an outer panel 1, an inner panel 2, and a flanged edge 3 surrounded by a vehicle frame section 5. A protective edge molding generally designated by the reference numeral 6 is adapted to be attached on an inside of the door 4. The molding 6 is formed of a V-shaped profile member made of, for example, polyvinyl chloride plastic material. The molding 6 includes a guide leg 7 terminating in a hook-shaped end portion 8 and a flat mounting leg 9.

The hook-shaped end portion 8 is provided with an outer boundary area 10 which extends approximately in parallel to a contact area 11 of the guide leg 7, which area 11 is adapted to contact an inner portion of the vehicle door 4. Several supporting ribs 12 are arranged at regular intervals along the length of the molding 6 to increase the angular rigidification thereof.

The protective edge molding is hung or installed along the edge of the vehicle door 4 with the hook-shaped end portion being disposed on or surrounding the flanged edge 3 of the vehicle door 4. The molding 6 is attached under a pretensioning with the mounting leg 9 to the inner panel 2 of the vehicle door 4 by means of, for example, sheet metal screws 13. When installed along the flanged edge 3 of the vehicle door 4, the boundary area 10 of the molding 6 lies almost flush with an outer surface of the vehicle door and an outer surface of the frame section 5 and covers the joint between these two body parts. Moreover, the outer surface of the vehicle body part may taper into the flanged edge 3 to be protected.

While we have shown and described only one embodiment in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

We claim:

1. A protective molding for an edge of a hinged motor vehicle part, characterized in that the molding has a substantially V-shape cross sectional configuration and includes a guide leg terminating along one longitudinal side in an end portion, and a mounting leg for mounting the molding on the vehicle part, the mounting leg being provided along the other longitudinal side of the guide leg, the guide leg defining a contact area adopted to contact an inner surface of the vehicle part adjacent said edge, and in that the end portion of the guide leg curves outwardly with respect to said V-shape configuration of the molding in a hook-shaped adapted to surround the edge of the vehicle part for protecting said edge, and wherein a portion of the outwardly curved, hook-shaped end portion of the guide leg adapted to surround said edge is tapered.

2. A protective molding according to claim 1, characterized in that the molding is made of an elastic material.

3. A protective molding according to claim 2, characterized in that the elastic material is a polyvinyl chloride material.

4. A protective molding according to one of claims 1, 2, or 3, characterized in that the end portion includes a boundary area which extends approximately in parallel to the contact area of the guide leg.

5. A protective molding according to claim 4, characterized in that the boundary area is adapted to lie almost flush with the outer surface of an adjacent part of the motor vehicle, which outer surface tapers in a direction toward the edge to be protected by the molding.

6. A protective molding according to claim 5, characterized in that a plurality of supporting ribs are arranged on the molding at regularly spaced intervals along an entire length of the molding.

7. A protective molding according to claim 6, characterized in that each of the supporting ribs extends along a line of alignment in a direction toward an apex of the boundary area.

8. A protective molding according to claim 7, characterized in that the fastening means are adapted to be disposed between adjacent supporting ribs.

9. A protective molding according to one of claims 1, 2, or 3, characterized in that the end portion includes a boundary area which is adapted to lie almost flush with the outer surface of an adjacent part of the motor vehicle, which outer surface tapers in a direction toward the edge to be protected by the molding.

10. A protective molding according to claim 9, characterized in that each of the supporting ribs extends along a line of alignment in a direction toward an apex of the boundary area.

11. A protective molding according to claim 9, characterized in that a plurality of supporting ribs are arranged on the molding at regularly spaced intervals along an entire length of the molding.

* * * * *